United States Patent
de la Barré

(12) 
(10) Patent No.: US 9,319,663 B2
(45) Date of Patent: Apr. 19, 2016

(54) IMAGE DISPLAY USING MATRIX SCREEN AND PERIODIC GRATING HAVING A FIXED PERIOD

(75) Inventor: René de la Barré, Mittweida (DE)

(73) Assignee: Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 169 days.

(21) Appl. No.: 13/113,715

(22) Filed: May 23, 2011

(65) Prior Publication Data

US 2011/0310092 A1 Dec. 22, 2011

Related U.S. Application Data

(60) Provisional application No. 61/346,946, filed on May 21, 2010.

(51) Int. Cl.
| | | |
|---|---|---|
| *H04N 13/04* | (2006.01) | |
| *G09G 5/00* | (2006.01) | |
| *G06T 15/00* | (2011.01) | |

(52) U.S. Cl.
CPC ......... *H04N 13/0409* (2013.01); *H04N 13/047* (2013.01); *H04N 13/0472* (2013.01); *H04N 13/0475* (2013.01); *H04N 13/0477* (2013.01); *G06T 15/00* (2013.01); *G06T 2207/10012* (2013.01); *G09G 5/003* (2013.01)

(58) Field of Classification Search
USPC ........................................................ 345/419
See application file for complete search history.

(56) References Cited

U.S. PATENT DOCUMENTS

| | | | | |
|---|---|---|---|---|
| 6,831,678 | B1 * | 12/2004 | Travis | 348/46 |
| 2006/0132916 | A1 * | 6/2006 | Oikawa et al. | 359/463 |
| 2006/0164528 | A1 * | 7/2006 | Harrold et al. | 348/276 |
| 2007/0002130 | A1 * | 1/2007 | Hartkop | 348/14.16 |
| 2008/0024598 | A1 * | 1/2008 | Perlin et al. | 348/55 |
| 2008/0117233 | A1 * | 5/2008 | Mather et al. | 345/690 |
| 2009/0123030 | A1 * | 5/2009 | De La Barre et al. | 382/103 |

FOREIGN PATENT DOCUMENTS

| | | | | |
|---|---|---|---|---|
| WO | WO 2006069555 A1 * | 7/2006 | | H04N 13/00 |
| WO | WO2009001161 A1 | 12/2008 | | |

OTHER PUBLICATIONS

Hoshino, H. et al., "Analysis of resolution limitation of integral photography", vol. 15, No. 8, Aug. 1998/ J. Opt. Soc. Am. A., pp. 2059-2065.

* cited by examiner

*Primary Examiner* — Kee M Tung
*Assistant Examiner* — Xin Sheng
(74) *Attorney, Agent, or Firm* — Faegre Baker Daniels LLP

(57) ABSTRACT

An image display device has a matrix screen having a plurality of pixels arranged in columns and a periodic grating arranged in front of the matrix screen having a structure extending parallel to the columns. A lateral direction grating period corresponds to a whole number multiple of adjacent column spacing of the matrix screen. In a use of this image display device, at least two different viewing positions are detected and disjunctive excerpts of columns of the matrix screen are determined in accordance with the detected viewing positions such that a respective excerpt is associated with each of the detected viewing positions, this excerpt including all columns at least partly visible through the grating from this viewing position, wherein the matrix screen is controlled in dependence with image information of at least two different images such that exactly one of the images is displayed on each of the excerpts.

8 Claims, 5 Drawing Sheets

IMAGE DISPLAY USING MATRIX SCREEN AND PERIODIC GRATING HAVING A FIXED PERIOD

RELATED APPLICATION

This application claims the benefit of U.S. Provisional Application Ser. No. 61/346,946 filed May 21, 2010 entitled "Image Display Device and Use Thereof", which application is incorporated by reference herein in its entirety.

TECHNICAL FIELD

The invention relates to an image display device which has a matrix screen having a plurality of pixels arranged in columns as well as a periodic grating arranged in front of the matrix screen and having a structure extending parallel to the columns and to a use of such an image display device.

BACKGROUND

Image display devices such as autostereoscopic screens are used to present 3D images so that they can be perceived three-dimensionally without special spectacles. A particular class of such screens, the class of the so-called "light field displays", is characterized by a specific geometry. With these screens, a period of the grating arranged in front of the matrix screen provided in the lateral direction corresponds to an integer multiple (whole number multiple) of a spacing of adjacent columns of the matrix screen, said grating deflecting light emanating from the pixels into different laterally mutually offset sectors. Such a screen has been described e.g. by H. Hoshino, F. Okano, H. Isono and I. Yuyama in J. Opt. Soc. Am. A 15, 2059, 1998.

The columns of such a matrix screen can be distributed in a cyclic order onto a number of channels corresponding to the whole number ratio between the column spacing and the grating period. Due to the specific geometry, the light emanating from the matrix screen is then directed or restricted by the grating so that light emanating from the pixels of each of these channels forms rays or light beams directed in parallel behind the grating. An appropriate use of the screen now provides that each of these channels is controlled using image information of precisely one view from a plurality of views which correspond to parallel projections of a scene from slightly deviating directions. Exactly one of these views is then displayed on the pixels of each of these channels. In a viewing space in front of the screen, a light field thereby arises in which a viewer of the screen can move and with both eyes sees two images which result in each case as a mixture of different ones of the parallel projected views. These images then correspond to two centrally projected images which complement one another as stereoscopic half-images to form a stereoscopic image so that the viewer perceives the scene three-dimensionally, and indeed from a direction dependent on his position.

In this manner, however, only comparatively small depths of field can be realistically displayed. A further disadvantage can be seen in that a significantly large amount of image information is required which can only be acquired with a large computation effort or with very complex taking processes, namely the image information of a plurality of parallel projections of the scene to be displayed.

SUMMARY

In some embodiments, the present invention pertains to a method of displaying images which manages with only comparatively small amounts of image information and can be realized with a correspondingly smaller effort, wherein a greater flexibility is desired with respect to the images which can be displayed using the method in a satisfactory manner. In some embodiments, the present invention pertains to a corresponding image display device which is suitable for satisfying these demands.

In some embodiments, the present invention pertains to a method that includes
detecting at least two different viewing positions;
determining disjunctive excerpt of columns of the matrix screen in dependence on the detected viewing positions such that one respective excerpt is associated with each of the detected viewing positions, such that this excerpt includes all columns at least partly visible from this viewing position through the grating, whereas none of the columns of this excerpt are visible from at least one other of the detected viewing positions; and
controlling the matrix screen in dependence on image information of at least two different images such that exactly one of the images is reproduced on each of the excerpts thus determined.

The image information is thereby handled more economically so that no more image information is required than is used for displaying the images actually visible from the detected viewing positions. In this respect, both stereoscopic images perceivable autostereoscopically by one or more viewers and, under certain circumstances, different scenes for a plurality of viewers can be displayed simultaneously.

In some embodiments, an advantageous image display device with which images can be displayed in the described manner accordingly has, in addition to the already named features, a tracking device for detecting at least two different viewing positions as well as a control unit for controlling the pixels of the matrix screen in dependence on image information of different images, wherein the control unit is configured or programmed to determine disjunctive excerpts of columns of the matrix screen in the described manner in dependence on the detected viewing positions and to control the matrix screen in dependence on image information of at least two different images.

In some embodiments, the pixels of the matrix screen may be subpixels of three different basic colors which combine to form one picture element. In this respect, different arrangements are conceivable, wherein the basic colors, in some embodiments, alternate in each column from the top to the bottom in a cyclic order.

In some embodiments, the different excerpts are formed by different columns of the matrix screen which are disposed next to one another and which can accordingly be controlled simultaneously. However, the possibility of a screen in which the excerpts are controlled sequentially in time and are formed in each case by the same pixels at different times while the grating is changeable over time should also explicitly not be excluded. An excerpt is then not only defined by the pixels included therein, but rather also by the position or the condition of the grating. Such a screen is e.g. shown in the document WO 2009/001161 A1. In this respect, it is a special case in which the period of the grating corresponds to the (simple) spacing between adjacent rows.

In some embodiments, the viewing positions can be eye positions of one or more viewers or head positions of viewers of the image display device. In this respect, for detecting the viewing positions, e.g. an image evaluation process can be used with which heads or eyes are recognized in images which are received by the tracking device from a space in front of the image display device. For this purpose, the tracking device can e.g. have a stereoscopic camera. Eye positions can in this respect be directly detected or can be concluded from initially detected head positions and values of experience via a mean eye spacing of typically approx. 65 mm.

In some embodiments, the detected viewing positions may therefore include two eye positions of a viewer, wherein the different images which are displayed on excerpts associated with these viewer positions may then be two mutually complementary half-images combining to form a stereoscopic image. A viewer of the image display device can thus be shown stereoscopic images of any desired depth of field, for which purpose the image information of only two stereoscopic half-images is sufficient.

The image display device can also be operated so that the detected viewing positions include head positions or eye positions of at least two different viewers and such that the different images which are displayed on the excerpts associated with these viewing positions display two different scenes. Different users of the image display device who take up a position next to one another in front of the image display device can then simultaneously see different image contents which are individually selectable for each of the users, e.g. different TV channels or video channels.

The determination of the named excerpts of columns in dependence on the viewing positions can take place in different manners. It is thus e.g. possible that one of the excerpts is determined such that this excerpt only includes the columns which are at least partly visible through the grating from the viewing position which this excerpt is associated with. This has the consequence that the region from which the image displayed on this excerpt is completely visible has a minimal extent around the viewing position. It can thus therefore e.g. be achieved that only one viewer can see an image content displayed on this excerpt ("private view"). At the same time, a leeway which is as large as possible thus remains for displaying other pieces of image information which should be visible from different viewing positions. A plurality of excerpts or all excerpts can naturally also be determined in this manner.

The determination of the excerpts can also be carried out so that the excerpts of columns associated with the different viewing positions together include all columns of the matrix screen. A freedom of movement which is as large as possible can thus be achieved around one or all viewing positions. Image information of e.g. two stereoscopic half-images can also be displayed so that a space remains next to a user who has a stereoscopic image displayed by said two stereoscopic half-images said space being as large as possible and from which other viewers can simultaneously see at least a two-dimensional image of the same scene.

Provision can be made that a movement of at least one of the viewing positions is detected and the excerpts are redefined in dependence on the detected movement so that the displayed images track a movement of a head movement of the user or users.

Under certain circumstances, the pixels within directly adjacent columns which belong to the same excerpt can, in addition to a dependence on the image information, be controlled row-wise in a weighted manner such that a center of brightness of a picture element displayed by this pixel is disposed centrally in a section of this picture element which is visible from the viewing position with which this excerpt is associated. If then a movement of at least one of the viewing positions is detected, a weighting with which the pixels within directly adjacent columns which belong to the same excerpt are controlled row-wise in a weighted manner is changed in dependence on the detected movement. Despite the finite extension of the pixels, an almost continuous tracking can thereby be achieved in which the viewer does not perceive any irritating discontinuities in the image.

BRIEF DESCRIPTION OF THE FIGURES

Embodiments of the invention will be explained in the following with reference to FIGS. 1 to 5.

DETAILED DESCRIPTION

Figure 1:
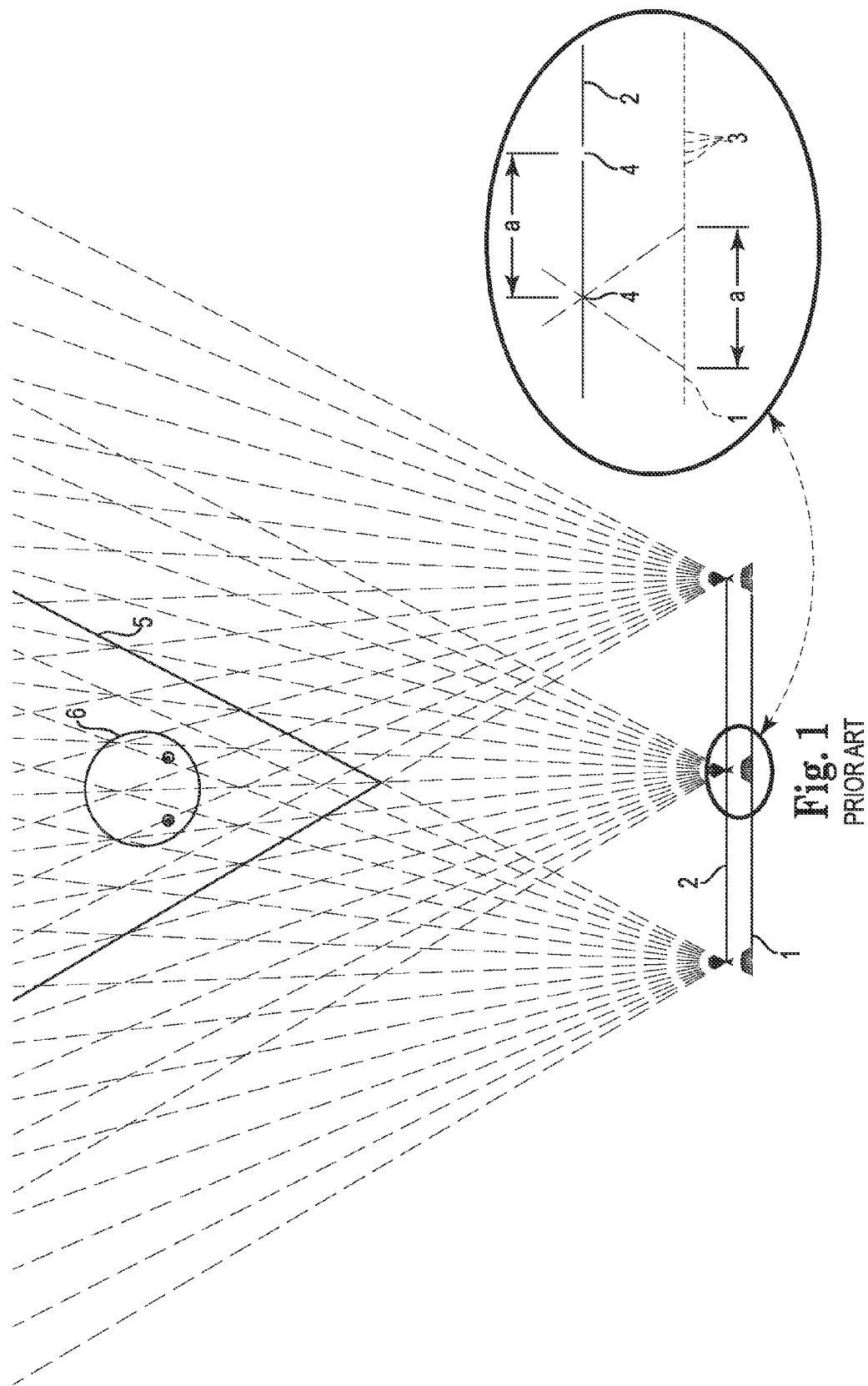
FIG. 1 is a schematic view of a screen known from the prior art and of a viewing space in front of this screen.

In some embodiments, the screen shown in FIG. 1 and in the further Figures has a matrix screen 1 and a period grating 2 arranged in front of the matrix screen 1. A section of the screen is shown enlarged again on the right in FIG. 1. The matrix screen 1, which is an LCD display, has a plurality of pixels 3 which are arranged in columns and rows and which are subpixels of three different basic colors, red, green and blue, wherein the basic colors of these subpixels alternate both in the row direction and in the column direction in a cyclic order in each case. A respective picture element can thus in particular be displayed by three subpixels of a column arranged over one another. The grating 2 is shown here as a periodic slit grating having a structure which is formed by a plurality of slits 4 extending parallel to the columns of the matrix screen 1. In other embodiments, cylindrical lenses extending parallel to the columns could be used instead.

The grating 2 directs light emanating from the pixels 3 into different sectors laterally mutually offset. In the present screen, a period of the grating 2 in the lateral direction given by a gap spacing a corresponds to a whole number multiple of a spacing of adjacent columns of the matrix screen 1. The geometrical relationships of the matrix screen 1 and of the grating 2 are shown here only by way of example such that exactly fourteen columns adopt a width corresponding to the gap spacing a on the matrix screen 1. The columns, and thus the pixels 3, of the matrix screen 1 can therefore here be distributed over fourteen channels so that light emanating from the pixels 3 of one of these channels exits the grating 2 in each case in parallel light beams. The light beams of the fourteen channels are illustrated for three different points on the screen in FIG. 1.

A light field thereby results from a superimposition of all fourteen channels in a viewing zone 5 in which a head of a viewer 6 is shown. If each of these channels is controlled using image information of a parallel projection of the same scene, wherein the parallel projections of the different channels in each case differ from one another by a slightly different projection direction, the viewer 6 in the viewing zone 5 can perceive the scene three-dimensionally, and indeed in each case from a direction which corresponds to his position in the viewing zone 5. In practice, in this respect, a lot more than fourteen channels will be used and a correspondingly smaller spacing will be provided between adjacent columns of the matrix screen 1.

Figure 2:
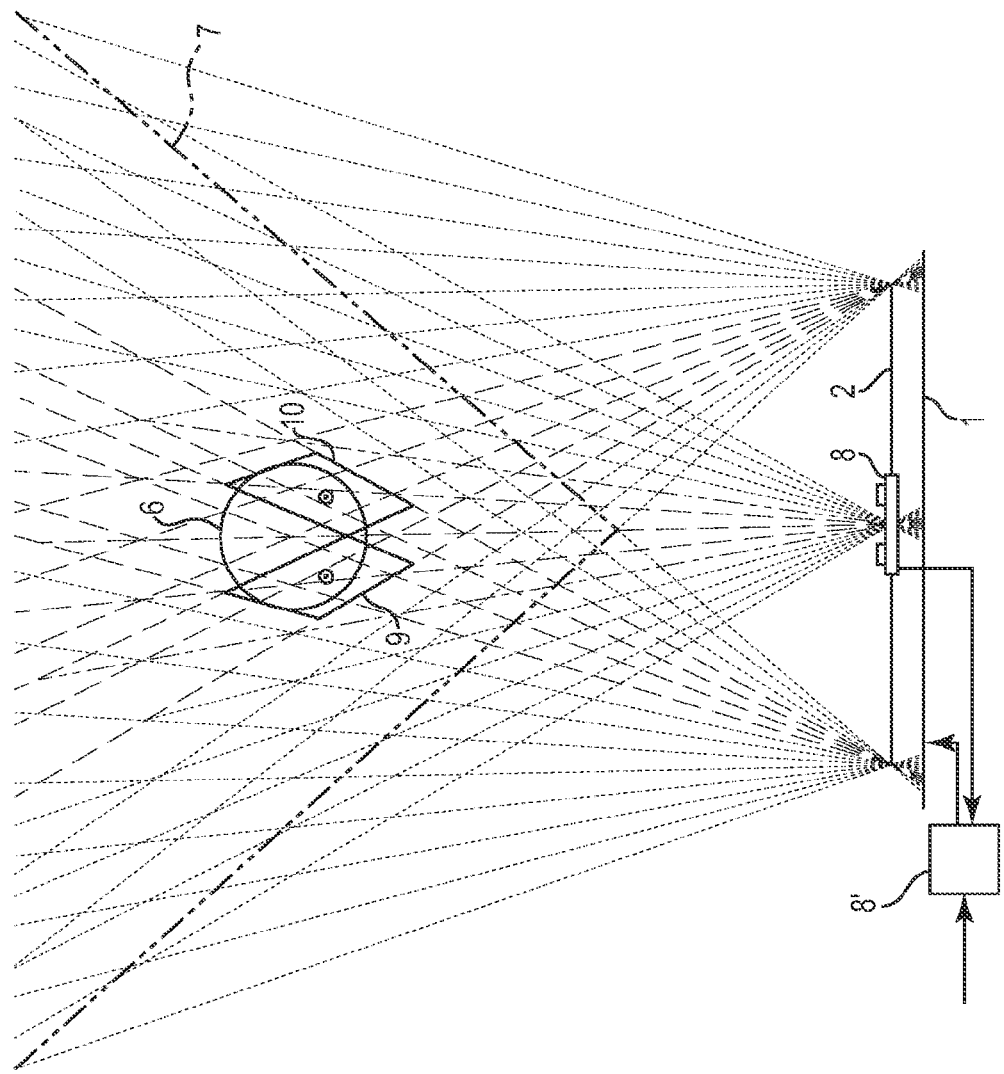
FIG. 2, in a corresponding representation, illustrates a use in accordance with the invention of this screen.

Another use of the same screen is illustrated in FIG. 2 in which the viewer 6 can likewise perceive a stereoscopic image and can in so doing move freely in an even larger viewing zone 7, wherein, however, a much smaller quantity of image information is required. Repeating features are again marked here and in the further Figures with the same reference numerals. In addition, the screen here has a tracking device 8 with which a head position and two eye positions of the viewer 6 and possibly of further viewers can be detected in the viewing zone 7. The tracking device 8 is in this respect designed as a stereoscopic camera having an image processing device so that the head positions and eye positions can be determined by an evaluation of images taken using the stereoscopic camera. To control the pixels 3 of the matrix screen 1, a control unit 8' is provided here which is configured from a technical program aspect to control the matrix screen 1 in dependence on the eye positions detected using the tracking device 1.

In this respect, first, disjunctive excepts of columns of the matrix screen 1 are determined, and indeed in dependence on the detected eye positions, such that a respective excerpt, that is, a subgroup of columns is associated with each of the two eye positions, so that this excerpt includes all columns which are visible at least partly through the grating 2 from the respective eye position. Thus, one of two excerpts is associated with a right eye position of the viewer 6 and another excerpt is associated with a left eye position of the viewer 6.

The matrix screen 1 is now controlled by the control unit 8' using image information of two mutually complementary stereoscopic half-images so that one of these two half-images is displayed on each of the two excerpts. A right half-image can thus be seen from a region 9 in which the right eye position lies, whereas a left half-image is visible from a region 10 in which the left eye position lies. The viewer 6 can thus autostereoscopically perceive a stereoscopic image composed of the two half-images.

If the viewer 6 moves so that the eye positions change, a movement of the eye positions is detected by the tracking device 8, whereupon the excerpts on which the two half-images are displayed are redefined by the control unit 8' in dependence on the detected movement. In this respect, the excerpts can, as indicated in FIG. 2, be determined, for example, so that each excerpt only includes the columns which are visible at least partly through the grating 2 from the eye position with which this excerpt is associated. The regions 9 and 10 in this case each have an extent which is the smallest possible so that only the viewer 6 can see a complete image. Alternatively, it would also be possible to define the excerpts larger and also to control the remaining columns of the matrix screen 1 using image information of one of the two half-images so that a further viewer within the viewing zone 7 could at least perceive a two-dimensional image. The excerpts could also in particular be defined so that the excerpts associated with the different eye positions together include all columns of the matrix screen 1.

Figure 3:
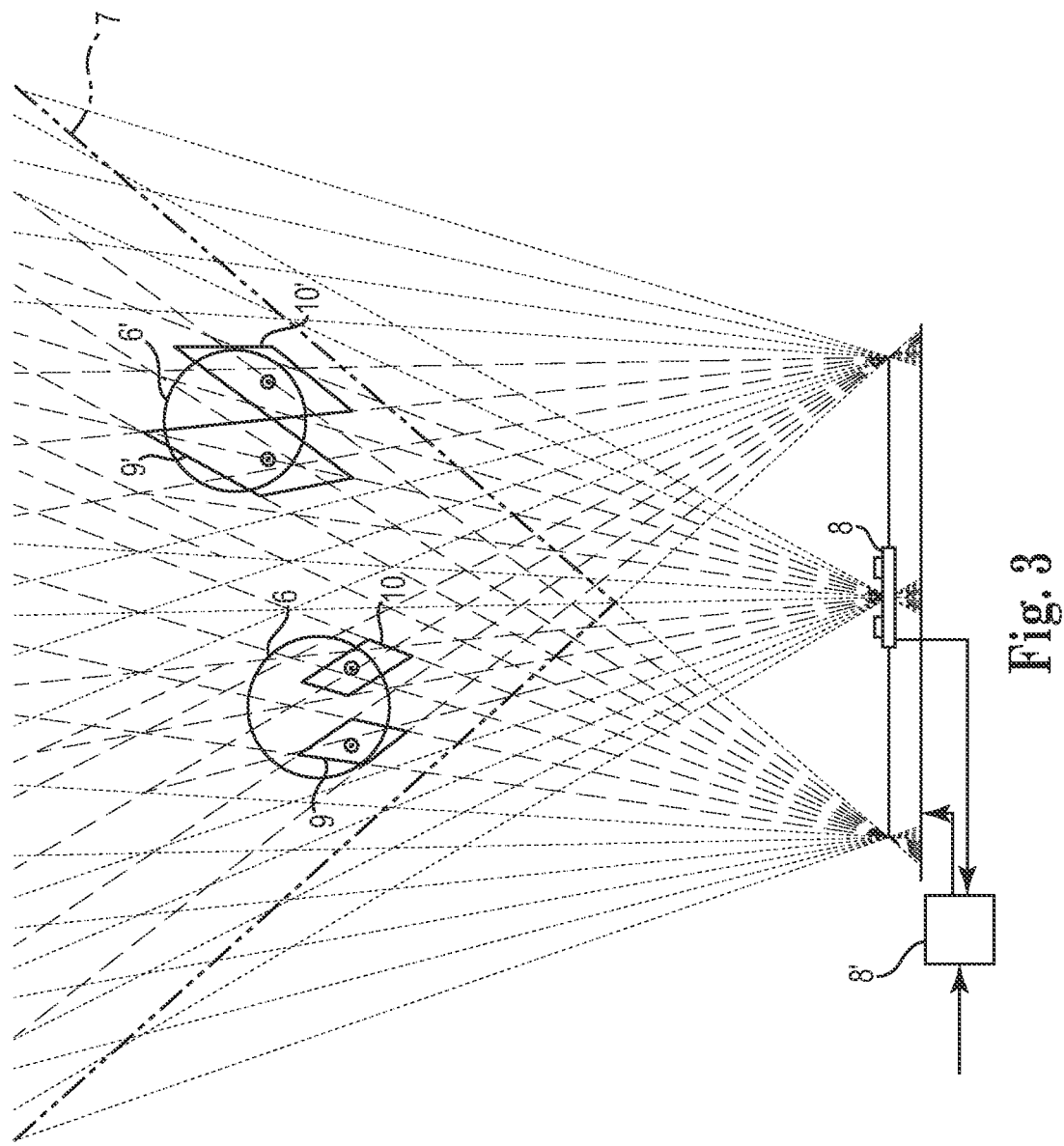
FIG. 3, in a corresponding representation, illustrates the same screen in a use by two different viewers.

In FIG. 3, the same screen is shown with the tracking device 8 and the control unit 8' in a different situation in which, in addition to the head of the viewer 6, a head of a further viewer 6' is located within the viewing zone 7. In addition to the two eye positions of the viewer 6, the tracking device 8 now also detects a right eye position and a left eye position of the further viewer 6'. A respective excerpt of columns of the matrix screen 1 is again determined for each of the detected eye positions so that a respective excerpt is associated with each of the eye positions so that this excerpt covers all columns at least partly visible through the grating 2 from this eye position, whereas none of the columns of this excerpt are visible from the other eye positions. Different images can now again be displayed on the different excerpts by a corresponding control of the matrix screen 1. In a simple case, these images can again be two stereoscopic half-images of the same scene so that both viewers 6 and 6' can perceive the same scene autostereoscopically. Alternatively, however, it is also possible that images which display two different scenes are displayed on the excerpts so that the viewer 6 can see a first scene and the viewer 6' can see a second scene. If image information of respective second complementary half-images are available for each of these scenes, the control of the matrix screen 1 can in this respect be carried out so that both viewers 6 and 6' can perceive the scene associated with them three-dimensionally in each case. A right half-image and a left half-image of the first scene is then visible from the regions 9 and 10, whereas a right half-image and a left half-image of the second scene are visible from two corresponding regions 9' and 10' in which the right and the left eye positions of the further viewer 6' are located.

Figure 4:
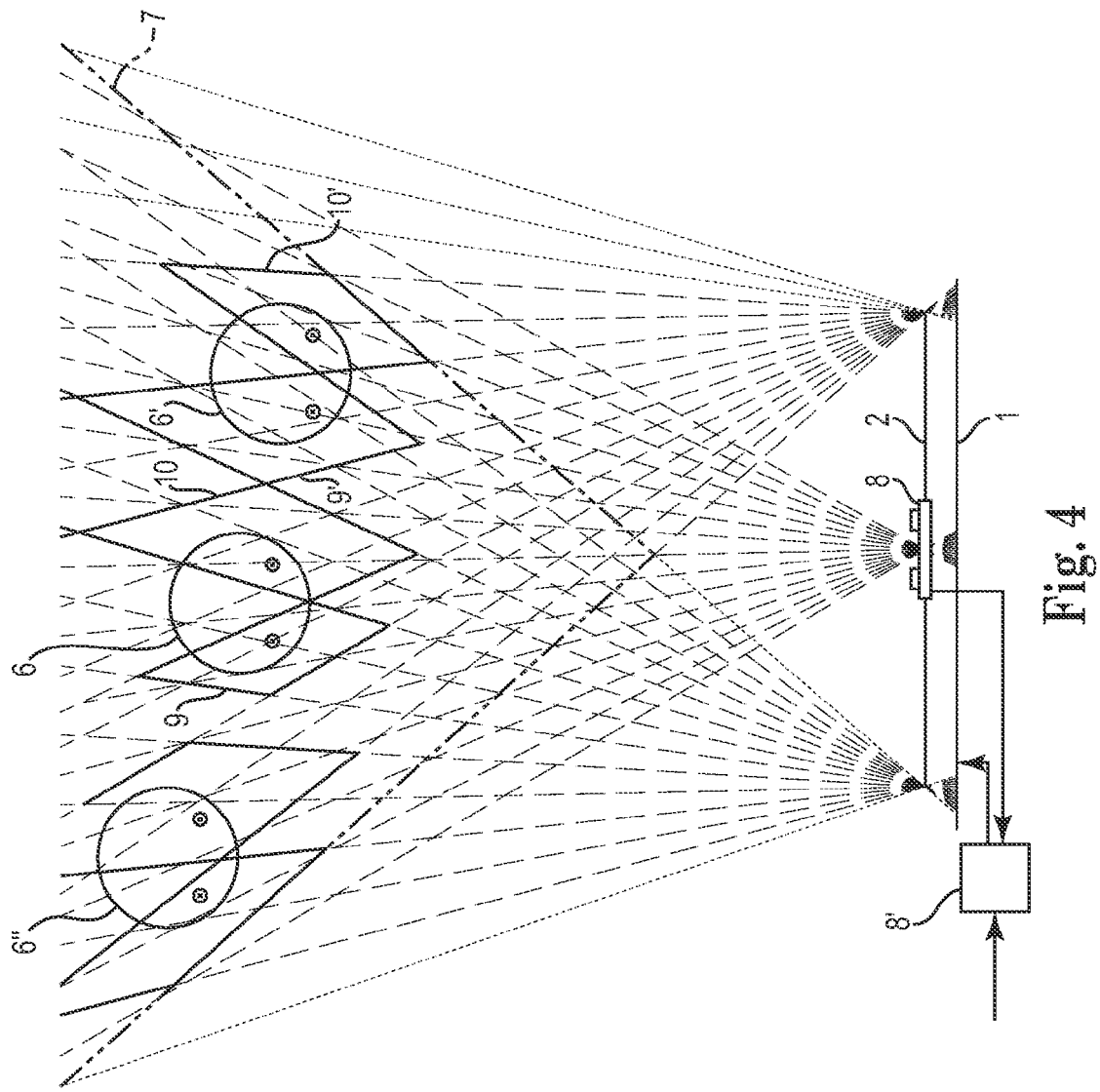
FIG. 4, a corresponding representation, illustrates the same screen in a use by three different viewers.

In FIG. 4, a situation is shown in a corresponding manner in which a head of a third viewer 6" is located within the viewing zone 7. A total of six eye positions are now detected by the tracking device 8 and accordingly six excerpts of columns are formed which are controlled using image information of a respective image so that each of the viewers 6, 6' and 6" can each see a scene three-dimensionally on the screen. So that the viewers 6, 6' and 6" in this respect have a freedom of movement which is as large as possible, the excerpts are selected in this case so that they together include all columns of the matrix screen 1. Provision can be made in this respect that the pixels 3 of directly adjacent columns which belong to the same excerpt are controlled, in addition to a dependence on the image information of the respective image, by a row-wise weighted intensity or brightness control so that a brightness center of a picture element displayed by these pixels 3 lies centrally in a section of this picture element which is visible from the eye position with which this excerpt is associated. If now a movement of the eye positions of one of the viewers 6, 6', 6" is detected, a weighting, with which the pixels 3 are controlled row-wise in a weighted manner within directly adjacent columns which belong to the same excerpt, can be changed in dependence on the detected movement—in addition to or independently of any required redefinition of the excerpts—so that, where possible, no discontinuities are perceived in the image quality despite the movement.

The control unit 8' can be designed as switchable between different operating modes so that it can be set how many viewers in the viewing zone 7 should be tracked and whether these viewers should each be shown the same image content or different image contents and whether these image contents should be perceivable three-dimensionally, if corresponding image information is present, by a display of complementary stereoscopic half-images.

Figure 5:
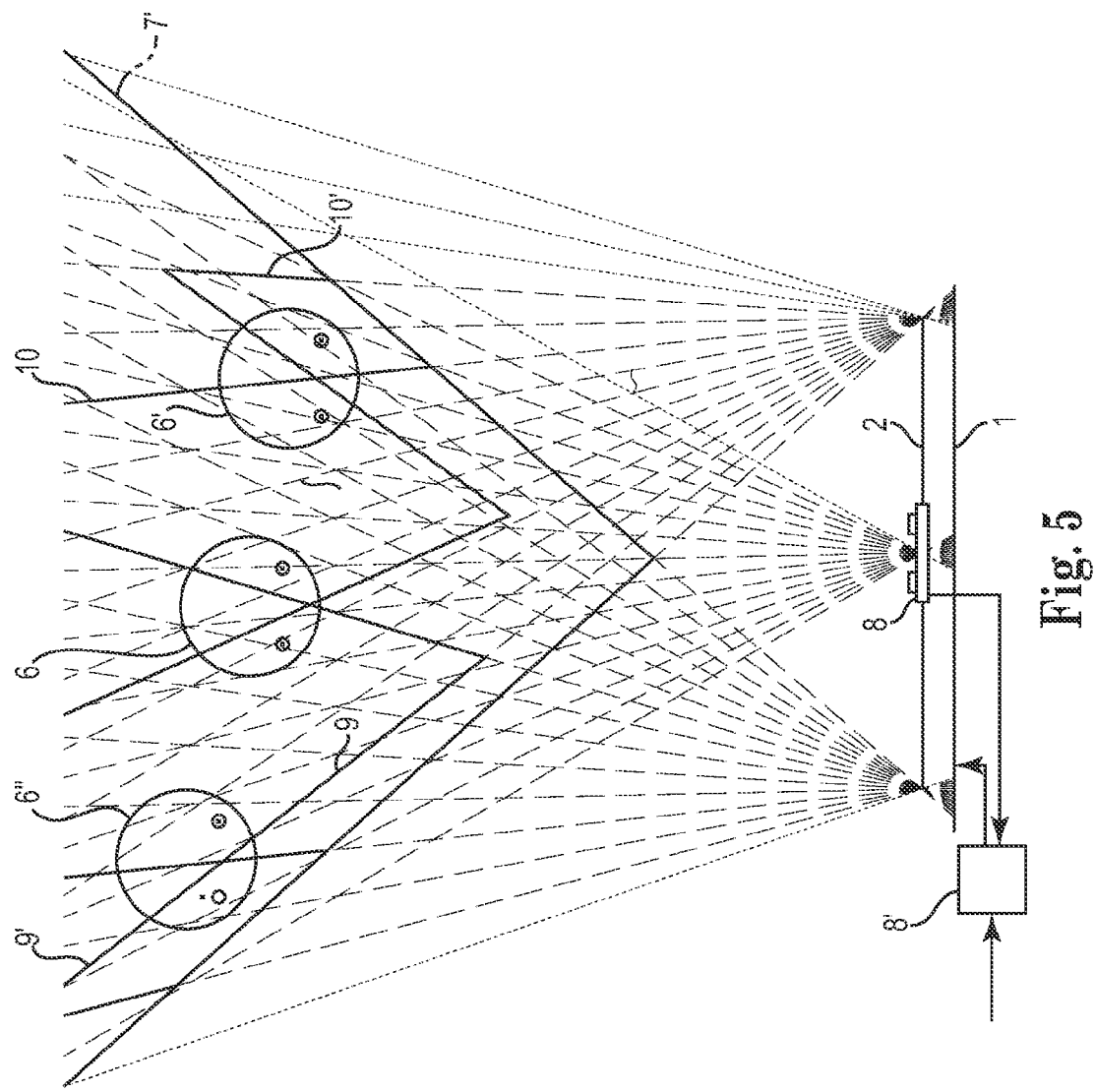
FIG. 5, in a corresponding representation, illustrates the same screen in a use by three viewers and with a different control of the screen.

In FIG. 5, finally, a further possible mode of operation of the same screen is shown. The heads of three viewers 6, 6' and 6" are also located in the viewing zone 7 here. Accordingly, two respective eye positions of each of the viewers 6, 6' and 6" are also detected here. The excerpts are now, however, defined so that the same excerpt is associated with the left eye position of the first viewer 6 and with the right eye position of the further viewer 6', whereas a common excerpt is also associated with the right eye position of the viewer 6 and with a left eye position of the third viewer 6". As with the preceding embodiments, two mutually complementary half-images which combine to form a stereoscopic image for the viewer 6 are displayed on these excerpts of the columns of the matrix screen 1. The left eye position of the third viewer 6' is, however, now also in the region 9 from which the right half-image is visible, whereas the region 10 from which the left half-image is visible now also includes the right eye position of the further viewer 6'. So that the viewers 6' and 6" can also each perceive a stereoscopic image, two further half-images which are complementary to the named half-images are displayed on two remaining excerpts which are associated with the left eye position of the further viewer 6' and with the right eye position of the third viewer 6". These half-images can accordingly be seen from regions 9' and 10' which include the right eye position of the third viewer 6" or the left eye position of the further viewer 6'. Three persons in the viewing zone 7 can thus be shown stereoscopic images using a total of only five mutually complementary stereoscopic half-images in a manner which brings about a freedom of movement for the viewers 6, 6' and 6" in the viewing zone 7 which is as large as possible with a corresponding tracking of the excerpts.

I claim:

1. A method of using an image display device that has a matrix screen having a plurality of pixels arranged in rows and columns as well as a periodic grating having a fixed period with respect to all user viewing positions, the periodic grating arranged in front of the matrix screen and having a structure extending parallel to the columns, wherein the fixed period of the periodic grating in a lateral direction corresponds to an integer multiple of a spacing of adjacent columns of the matrix screen and wherein the periodic grating directs light emanating from the pixels in different sectors mutually laterally offset, the method comprising:
   detecting at least two different viewing positions including head positions or eye positions of at least two different viewers;
   determining disjunctive excerpts of columns of the matrix screen in dependence on the detected viewing positions such that one respective excerpt is associated with each of the detected viewing positions, such that this excerpt includes all columns at least partly visible from this viewing position through the periodic grating, whereas none of the columns of this excerpt are visible from at least one other of the detected viewing positions; and
   controlling the matrix screen in dependence on image information of at least two different images such that exactly one of the images is reproduced on each of the excerpts thus determined,
   wherein the pixels of directly adjacent columns which belong to the same excerpt are controlled, in addition to a dependence on the image information, in each of the rows in a weighted intensity or brightness control such that a center of brightness of a picture element reproduced by these pixels is placed in a center of a section of this picture element which is visible from the viewing position with which this excerpt is associated.

2. The method in accordance with claim 1, wherein the detected viewing positions include two eye positions of a viewer and wherein the different images which are displayed on the excerpts associated with these viewing positions are two mutually complementary half-images combining to form a stereoscopic image.

3. The method in accordance with claim 1, wherein at least one of the excerpts is determined so that this excerpt only includes the columns which are at least partly visible through the periodic grating from the viewing position which is associated with this excerpt.

4. The method in accordance with claim 1, wherein the excerpts of columns associated with the different viewing positions together include all columns of the matrix screen.

5. The method in accordance with claim 1, wherein a movement of at least one of the viewing positions is detected and the excerpts are redefined in dependence on the detected movement.

6. The method in accordance with claim 1, wherein a movement of at least one of the viewing positions is detected and a weighting with which the pixels are controlled row-wise in a weighted manner within directly adjacent columns belonging to the same excerpt is changed in dependence on the detected movement.

7. The method in accordance with claim 1, wherein the different images which are displayed on the excerpts associated with the head positions or eye positions of the at least two different viewers display two different scenes such that the different viewers see different image contents which are individually selectable for each of the different viewers.

8. An image display device comprising:
   a matrix screen with a plurality of pixels arranged in rows and columns;
   a periodic grating having a fixed period with respect to all user viewing positions, the periodic grating arranged in front of the matrix screen and having a structure extending parallel to the columns, wherein the fixed period of the periodic grating in a lateral direction corresponds to an integer multiple of a spacing of adjacent columns of the matrix screen and wherein the periodic grating is suitable to deflect light emanating from the pixels in different sectors mutually laterally offset;
   means for detecting at least two different viewing positions including head positions or eye positions of at least two different viewers; and
   a programmed control unit connected to the matrix screen for controlling the pixels of the matrix screen in dependence on image information of different images, the control unit being configured to:
   determine disjunctive excerpts of columns of the matrix screen in dependence on the detected viewing positions such that one respective excerpt is associated with each of the detected viewing positions, such that this excerpt includes all columns at least partly visible from this viewing position through the periodic grating, whereas none of the columns of this excerpt are visible from at least one other of the detected viewing positions; and
   control the matrix screen in dependence on image information of at least two different images such that exactly one of the images is reproduced on each of the excerpts thus determined and such that the pixels of directly adjacent columns which belong to the same excerpt are controlled, in addition to a dependence on the image information, in each of the rows in a weighted intensity or brightness control such that a center of brightness of a picture element reproduced by these pixels is placed in a center of a section of this picture element which is visible from the viewing position with which this excerpt is associated.

* * * * *